United States Patent
Khosla et al.

(10) Patent No.: US 9,062,906 B2
(45) Date of Patent: Jun. 23, 2015

(54) RETROFITTABLE AIR CONDITIONER TO REFRIGERATION CONVERSION UNIT

(75) Inventors: Ronald R. Khosla, New Paltz, NY (US); Timothy J. Weber, Ithaca, NY (US)

(73) Assignee: Store It Cold, LLC, Lehigh Acres, FL (US)

( * ) Notice: Subject to any disclaimer, the term of this patent is extended or adjusted under 35 U.S.C. 154(b) by 162 days.

(21) Appl. No.: 12/803,540

(22) Filed: Jun. 29, 2010

(65) Prior Publication Data

US 2010/0269519 A1    Oct. 28, 2010

Related U.S. Application Data

(63) Continuation-in-part of application No. 11/724,129, filed on Mar. 14, 2007, now abandoned.

(51) Int. Cl.

| | |
|---|---|
| F25D 19/00 | (2006.01) |
| F25B 49/00 | (2006.01) |
| F25D 21/06 | (2006.01) |
| F25D 29/00 | (2006.01) |
| F25D 21/00 | (2006.01) |
| G05D 23/32 | (2006.01) |
| G05D 23/19 | (2006.01) |
| G05D 23/30 | (2006.01) |

(52) U.S. Cl.
CPC .......... *F25D 29/00* (2013.01); *G05D 23/1927* (2013.01); *G05D 23/30* (2013.01); *G05D 23/193* (2013.01); *F25D 21/00* (2013.01); *G05D 23/32* (2013.01); *F25B 2700/11* (2013.01); *F25D 2400/02* (2013.01)

(58) Field of Classification Search
CPC ... G05D 23/30; G05D 23/32; G05D 23/1927; G05D 23/193; F25D 2400/02; F25D 21/00; F25D 29/00

USPC .......... 62/125, 127, 128, 150, 154, 208, 298; 236/1 C; 700/276, 278; 374/133
See application file for complete search history.

(56) References Cited

U.S. PATENT DOCUMENTS

| | | | | |
|---|---|---|---|---|
| 3,158,005 | A | * | 11/1964 | Jungemann ...................... 62/156 |
| 3,453,837 | A | * | 7/1969 | Ting et al. ......................... 62/140 |
| 3,834,618 | A | * | 9/1974 | Buckwalter ................. 236/46 R |

(Continued)

OTHER PUBLICATIONS

Seeing is Beleiving: Check the Evaporator Coil; published by the Air Conditioning | Heating | Refrigeration News Jan. 5, 2001 and retrieved from http://www.achrnews.com/articles/seeing-is-believing-check-the-evaporator-coil on Sep. 26, 2013.*

(Continued)

*Primary Examiner* — Mohammad M Ali
*Assistant Examiner* — Daniel C Comings
(74) *Attorney, Agent, or Firm* — Brown & Michaels, PC

(57) ABSTRACT

A conversion unit for an air conditioning system to cause it to act like the cooling unit of a refrigeration system comprises a frost detector, an A/C temperature control defeating mechanism and a control unit which operate together to force the range of operation of the air conditioning unit into the range of operation of a refrigeration unit. The conversion unit is particularly useful for providing low cost cooling systems for farmers in third world countries for keeping their produce fresh and safe, not to mention its use by all farmers around the world and by florists or others in need or desire of an economical refrigeration alternative. The present invention is also usable to provide inexpensive cooling to RV's and to refrigerated vehicles.

3 Claims, 9 Drawing Sheets

(56) References Cited

U.S. PATENT DOCUMENTS

| | | | |
|---|---|---|---|
| 3,972,471 A * | 8/1976 | Ziegler | 236/46 R |
| 4,023,947 A * | 5/1977 | Ferry | 62/180 |
| 4,035,752 A * | 7/1977 | Anderson | 337/107 |
| 4,109,481 A | 8/1978 | Peek | |
| 4,119,936 A * | 10/1978 | Laviana et al. | 337/303 |
| 4,171,769 A * | 10/1979 | Trimpey | 236/46 R |
| 4,183,223 A * | 1/1980 | Alsenz | 62/80 |
| 4,404,852 A | 9/1983 | Goto | |
| 4,530,218 A * | 7/1985 | Janke et al. | 62/156 |
| 4,578,959 A | 4/1986 | Alsenz | |
| 4,593,533 A | 6/1986 | Alsenz | |
| 4,649,713 A | 3/1987 | Bezek | |
| 4,662,184 A * | 5/1987 | Pohl et al. | 62/156 |
| 4,862,701 A | 9/1989 | Small et al. | |
| 6,092,925 A | 7/2000 | Nojiri | |
| 6,820,435 B2 * | 11/2004 | Anderson et al. | 62/202 |
| 6,834,509 B2 | 12/2004 | Palfy et al. | |
| 6,886,351 B2 | 5/2005 | Palfy et al. | |
| 2004/0168451 A1* | 9/2004 | Bagley | 62/196.4 |
| 2005/0269419 A1* | 12/2005 | Neranjan et al. | 236/51 |
| 2006/0181855 A1* | 8/2006 | Chen et al. | 361/717 |

OTHER PUBLICATIONS

Darwinian Gastronomy; published by PBS and retrieved from http://www.pbs.org/wgbh/evolution/library/10/4/I_104_02.html on Sep. 26, 2013.*

Nagengast, Dan—"Low-cost cooler uses old air conditioner", Growing for Market, Nov. 1995, p. 14.

Talbot, M.T. and Fletcher, J. H.—"A Portable Demonstration Forced-Air Cooler", Proc. Fla. State Hort. Soc. 106:249-255 (1993), reprinted as publication CIR1166, Agricultural and Biological Engineering Department, Florida Cooperative Extension Service, Institute of Food and Agricultural Sciences, University of Florida (Jun. 1996).

Pure Petals blog—"Cool Bot—An Affordable Cooler for Flower Growers", http://purepetals.wordpress.com/, posted Aug. 11, 2008.

Upson, Steve—"Portable Building Coolers for Market Gardeners" http://www.noble.org/ag/soils/buildingcoolers/, posted Sep. 2009.

Dubey, Neeru—"Use of coolbot technology for construction of low cost-low capacity cold storages on farms" http://www.fruits.soton.ac.uk/files/2011/12/Use-of-Coolbot-Technology-for-Construction-of-Low-Cost-Low-Capacity-Cold-Storages-on-Farms_-Dr-Neeru-Dubey.pdf, posted 2011.

Talbot, M.T. and Fletcher, J. H.—"Design and Development of a Portable Forced-Air Cooler", Proc. Fla. State Hort. Soc. 106:249-255 (1993). p. 251. missing in all copies of the document available.

Ross, David S. "More Details on the USDA Portacooler Cooling System." http://www.bre.umd.edu/portacooler2.htm. 2005.

USDA Transportation Tip—The Portacooler. http://www.bre.umd.edu/portacooler3.htm. 2005.

Munzer, Aaron. "CoolBot Enables Small Farmers to Build Do-it-Yourself Coolers." http://smallfarms.cornell.edu/2012/06127/coolbot-enables-small-farmers-to-build-do-it-yourself-coolers/. 2012.

* cited by examiner

RETROFITTABLE AIR CONDITIONER TO REFRIGERATION CONVERSION UNIT

CROSS REFERENCE TO RELATED APPLICATION

This application is a continuation-in-part of application Ser. No. 11/724,129 filed on Mar. 14, 2007 now abandoned.

TECHNICAL FIELD

The present invention is generally directed to the conversion of conventional air conditioning system units so as to operate more capably as part of a complete refrigeration system. Thus, as compared to conventional air conditioning units, the present invention permits the economical construction of insulated volumes which are now capable of being cooled to near freezing levels. More particularly, the present invention is directed to a separate unit, which is configured with a conventional air-conditioning unit in order to convert it to the core of a refrigeration system, as opposed to its function as a mere air conditioner.

BACKGROUND OF THE INVENTION

It is well known that air conditioning units are relatively inexpensive. They can often be purchased for amounts even as low as $30 in some developing countries; domestic prices can be found as being as low as around $150. In contrast, refrigeration systems that are employed in commercial settings tend to be expensive and have relatively high power demands and installation requirements. Accordingly, it is seen that there is a need for a mechanism, which is capable of converting an inexpensive air-conditioning unit so that it operates as the core of a refrigeration system.

However, it is not well known that air conditioning units are typically designed to shut down their compressor operations when it gets too cold. For the typical room size air conditioner, this temperature is around 64° F. but may be as low as 60° F. For example, Frigidaire® has made an air conditioner unit in which a temperature sensor is disposed in thermal contact with the coils of the device. When the coils become "too" cold, the compressor is shut down. One of the reasons that they do this is to control the viscosity of the refrigerant since efficiency is adversely affected by having the refrigerant pass through an expansion valve (orifice) which is too small relative to the fluid's viscosity. Later models of the Frigidaire® units eliminate this temperature sensor and instead rely solely on the room air temperature sensor which is still used to shut the compressor down at a temperature of around 60° F.

It is also noted that not all air conditioning units employ a thermistor type of temperature sensor. Again, this temperature sensor is for room air and is intended to determine the point at which the unit shuts down to avoid further cooling. Some A/C units, such as those typified by units installed in recreational vehicles, employ a long copper capillary tube as part of an analog design. These units typically employ an integral switch assembly with a rotatable analog setting knob which controls the lower cutoff temperature based on temperatures to which the relatively lengthy capillary tube is exposed. Such units are found in recreational vehicles (RVs) and in older air conditioners as well as in inexpensive air conditioners sold in developing countries. The present invention includes an embodiment that is compatible with this A/C design as well and allows RV air conditioners to operate large truck cooling systems at a cost of around $2,400 instead of the present cost of around $14,000.

It is further noted that there is a significant need for inexpensive refrigeration systems. In particular, farmers would very much like to have an inexpensive method for keeping their produce and crops at reduced temperatures were for storage and for longer shelf life. Additionally individuals such as florists, restaurants, and grocery stores would also benefit from having inexpensive refrigeration systems. Furthermore, as desirable as these systems are in the United States, they are immeasurably more desirable in other parts of the world where refrigeration is at a premium but which is nonetheless a necessity because of the elevated temperatures of the climates in these regions.

In addition to the fact that refrigeration systems are expensive, it is also the case that such systems are very demanding in terms of their electrical power requirements. It is therefore seen that there is also a need for cooling systems that require less electricity than is consumed by conventional cooling systems which the current invention in combination with a standard window air conditioning unit is capable of doing.

One of the problems with using a conventional air-conditioning unit as part of a refrigeration system is that such units are designed with specific controlling features in mind, which limit their operations, cycle duration and their cooling capabilities. For example, the control units for a conventional window air conditioner are set so that the units turn off at a relatively high sensed temperature. Nonetheless, for purposes of using a conventional air-conditioning unit as the core of a refrigeration system, these air conditioners, with their conventional control units, are set up so that it is always far from the case that humidity is allowed to condense on the fins of the unit in the form of ice. In short, in their normal mode of operation, conventional air-conditioning systems are designed to cut out at a relatively high temperature. It is therefore seen that in their off-the-shelf state, these units are not capable of operating as refrigeration units. The adapter units of the present invention provide a retrofit mechanism which extends the range of operation for a conventional air conditioning unit. This is found to be particularly advantageous in relatively small and inexpensive window units.

SUMMARY OF THE INVENTION

Accordingly, in order to solve these problems, there is provided a simple retrofittable conversion unit, which includes a frost detector, a control unit and a heater, which is used to "fool" the temperature sensor in a conventional air conditioner. The present invention comprises a device to adapt an air-conditioning unit to a lower temperature of operation. The device comprises a sensor for detecting the presence of frost on the fins of the air conditioning unit and a heater for disposition adjacent to a temperature sensor for the air conditioning unit. A control unit deactivates the heater upon the condition that the sensor provides an indication that there is frost on the fins. There is also provided a method of installation of the present device so that it easily works with a conventional, off-the-shelf A/C unit.

In accordance with another embodiment of the present invention, there is provided a corresponding method for operating an existing air conditioning unit having fins across which air is directed to cool it, so as to achieve a lower temperature of operation. This method includes the following steps: applying heat to a temperature sensor present in the air conditioning unit; sensing the presence of frost on the fins the air conditioning unit; and controllably adjusting heat applied to the temperature sensor to produce continued operation without producing significant frost build up on the fins.

In accordance with yet another embodiment of the present invention, there is provided a method for the conversion of an existing air conditioning unit into a unit capable of operating as the core of a refrigeration system which operates at near freezing temperatures. In this method a heater in an adapter is thermally connected to the temperature sensor of the air conditioner. A frost sensor in the adapter unit is disposed adjacent to the fins of the air conditioner. The adapter is electrically connected to the air conditioner to supply the adapter with power. These steps may be performed in any convenient order.

In accordance with yet another embodiment of the present invention, the heater is replaced by a relay which replaces the integral knob/capillary-tube switch described above. Instead of driving an electric heater, the present invention also encompasses the concept of entirely replacing the temperature control of an A/C unit with a relay. This is easy to accomplish since the integral knob-capillary tube switches are typically provided as a single pluggable (and therefore unpluggable) unit.

In yet another embodiment of the present invention the heater is replaced by wiring directly into the air conditioner control board in place of and at the point of the air conditioner's temperature sensor probe and then providing synthesized variable resistance values that mimic colder or warmer readings from the original air conditioner's temperature sensor.

The present invention is also characterizable as an auxiliary control mechanism for an air conditioning device that already has a control mechanism albeit one that precludes its operation below a certain temperature.

Accordingly, it is an object of the present invention to bring the advantages of refrigeration to areas of the country and the world where it is most needed and least affordable.

It is also an object of the present invention to provide a retrofit mechanism which extends the range of operation of conventional A/C units.

It is a still further object of the present invention to provide a method for easy installation of the present device.

It is yet another object of the present invention to provide an effective and economical refrigeration system.

It is also an object of the present invention to provide an economical device and system for the improved preservation of produce together with all of the health and food safety benefits that that entails.

It is a still further object of the present invention to provide inexpensive A/C cooling systems for use in refrigerated trucks and/or other commercial vehicles.

Lastly, but not limited hereto, it is an object of the present invention to provide an add-on device for controlling A/C units so as to make them usable in conjunction with easily implementable insulated or insulatable volumes which can be kept at near freezing temperatures.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
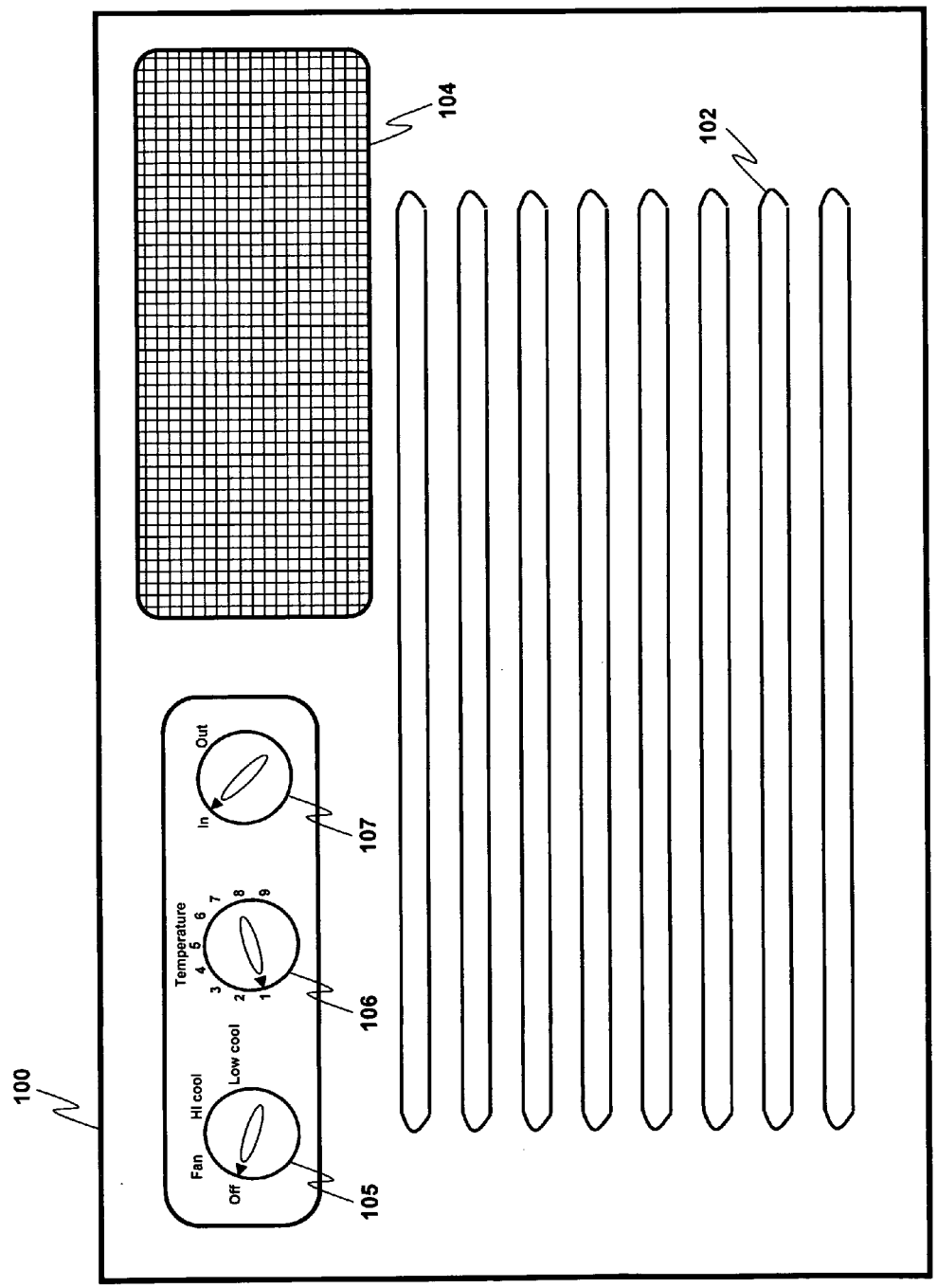
FIG. 1 is a front view of a conventional room or window air-conditioning unit, illustrating the typical controls provided with such a unit.

FIG. 1 illustrates a conventional room or window air-conditioning unit 100. The front of such units typically include vent openings 102, through which cooled air is supplied to a room. Such units also typically include vent openings 104, through which room air may be exhausted. In particular fans or other air moving devices are operated in reverse mode under control of switch 107. Switch 107 is typically provided with the control function of supplying air to the room or removing air from the room in an exhaust mode. Such a mode of operation is conveniently provided so that the fan provided with unit 100 is capable of supplying cooler evening air from the outside through vents 102 while at the same time, exhausting warmer interior air through exhaust vent 104. Switch 107 controls this function. Additionally there is also provided temperature control switch 106, which allows a user to choose a temperature below which the unit ceases its cooling function. Once a desired temperature is reached, the units compressor function is shut down. However, the units fan may continue operation for a predetermined time following the determination that he desired room temperature has been reached. Conventional unit 100 also includes control switch 105, which selects the mode of operation. In one mode of operation, a user may select to operate only the fan and not the units compressor or cooling function. This may be desirable for example, in situations in which a simple exchange of room air with outside air is desired. Mode control switch 105 also typically provides to other modes of operation: hi cool and low cool. The hi cool mode of operation is one in which greater electrical current is supplied to either or both of the fan motor and or compressor motor to select either the degree and or speed of cooling.

Figure 2:
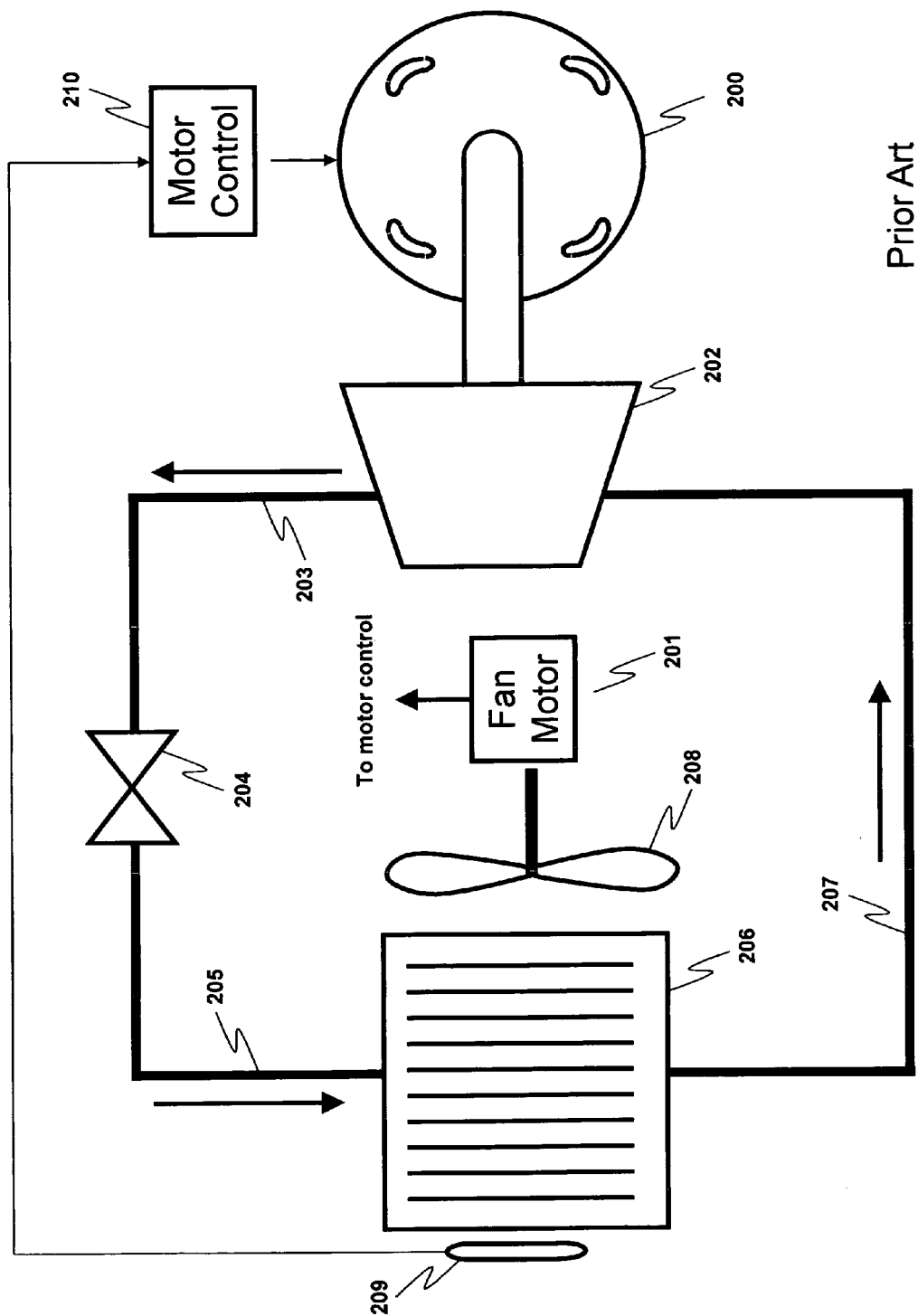
FIG. 2 is a block diagram view of a conventional room or window air-conditioning system.

Since the structure and operation of the present invention is based upon a modification of the conventional system employed in off-the-shelf room and window air conditioners, it is appropriate to consider the usual refrigeration cycle and the controls that are normally imposed thereon. Accordingly, the structural block diagram shown in FIG. 2 is provided in order to enhance one's understanding of the parameters and controls involved. In particular, it is seen that motor 200 drives compressor 202, which compresses a refrigerant. This refrigerant flows through conduit 203 to expansion valve 204. In expanding through this valve, the compressed refrigerant is cooled in accordance with well known thermodynamic principles. The cooled fluid is passed through conduit 205 to condenser 206. Condenser 206 includes fins across which fan 208 blows air which is cooled via its thermal contact with the fins of condenser 206. In condenser 206 refrigerant is warmed by the passage of air across its fins and the fins are cooled by being in thermal contact with the refrigerant which has been cooled by its passage through expansion valve 204. Thus warmed coolant is returned via conduit 207 to compressor 202 at which point the cycle repeats.

Motor control 210 controls the operation of compressor motor 200, and fan motor 201. Under control of selector switch 107 fan 208 may be operated in reverse to provide an exhaust function. More particularly, motor control 210 responds to signals input from temperature sensor 209. Motor control 210 also receives input signals from switches 105, 106 and 107 shown in FIG. 1.

Figure 3:
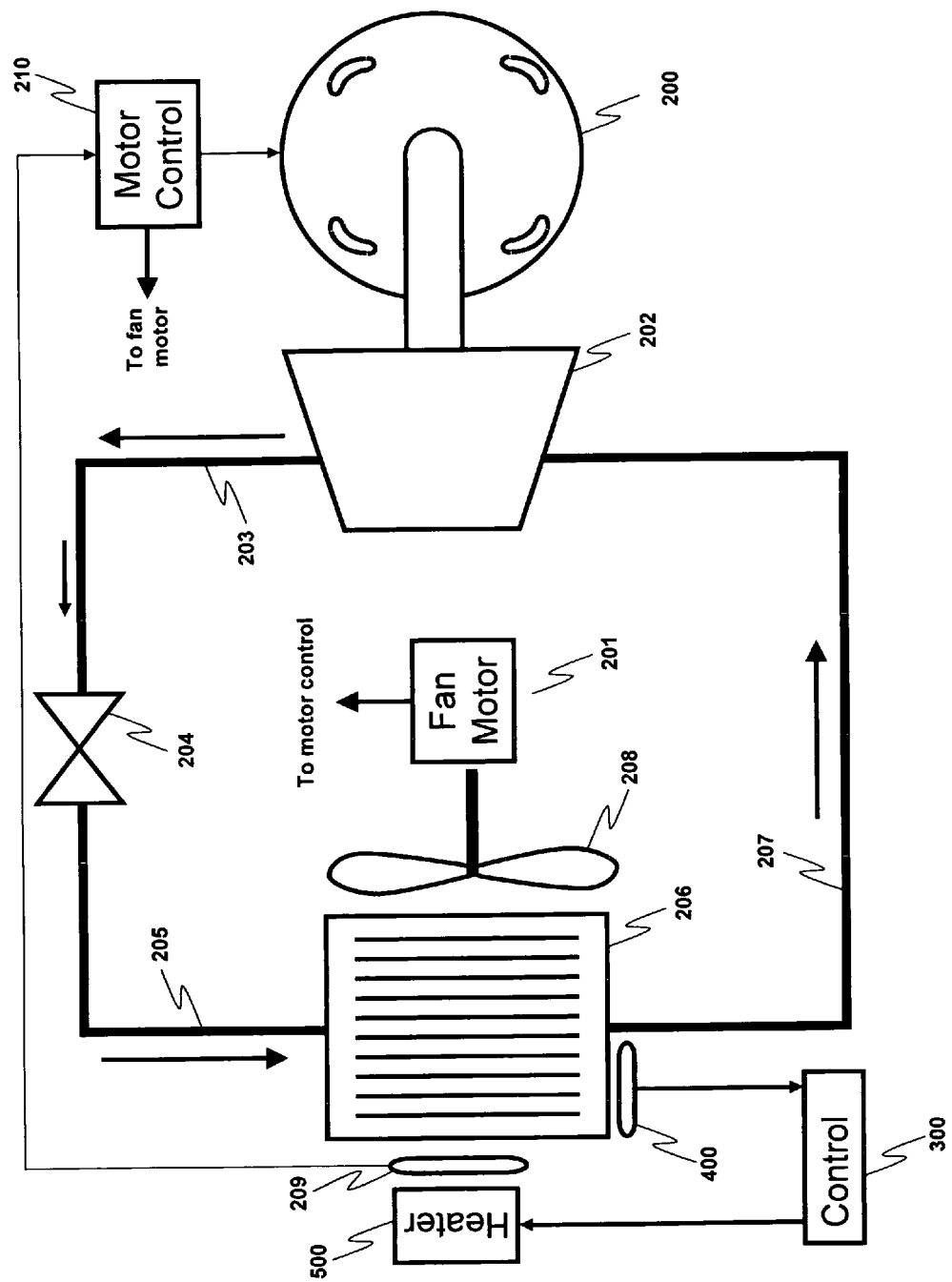
FIG. 3 is a block diagram of the retrofit apparatus of the present invention used to modify the conventional operation of room or window air-conditioning units in order to provide a refrigeration function.

The present invention provides a retrofit apparatus, which is used to better control the conventional refrigeration cycle illustrated in FIG. 2. Since the normal temperature range of operation for a room or window air conditioner is not so low as to cause ice build up on the fins of condenser 206, there is no need in such units to provide for frost or ice detection. Since these units have not been contemplated for use as the central core of a refrigeration system, as opposed to a simple room air cooling system, frost or ice detection has not been seen as either a desired or necessary function. However, if one wished to use such units in any refrigeration function where the temperature range is significantly lower, frost or ice accumulation is a problem. Accordingly, one of the elements provided in the retrofit apparatus of the present invention is frost or ice sensor 400 as shown in FIG. 3. This is preferably implemented as temperature sensor, however, any convenient means for detecting frost may also be employed including electrical conduction and/or optical sensors.

Additionally, as noted above, conventional room or window air conditioners are not designed to function below certain temperatures. Such units are designed essentially for cooling a room not for turning it into a refrigeration structure. Accordingly, the retrofit apparatus of the present invention also includes heater 500, which is disposed in close proximity to temperature sensor 209. Control 300 operates to activate heater 500 so as to effectively fool temperature sensor 209. However, it is noted that by choosing to operate at lower temperatures, frost or ice detector 400 is employed, whereas before no such sensor was needed or desired.

Accordingly, it is seen that the present invention provides a retrofit apparatus having three complements. Heater 500 is employed to essentially force the air conditioning unit to operate so as to produce lower temperature air. Frost or ice sensor 400 is employed to ensure continued operations at the lower desired temperature, which is more in the range of a refrigeration system than in the range of a room cooling system. Control unit 300 separately receives a user supplied indication of desired temperature. Using heater 500 and sensor 400 control unit 300 operates to control the conventional room or window air-conditioning unit in the manner described above. In preferred embodiments of the present invention, heater 500, sensor 400 and control unit 300 are provided in a single package, which is easily connected into and coupled with a conventional room or window air-conditioning unit to provide a refrigeration function.

Figure 4:
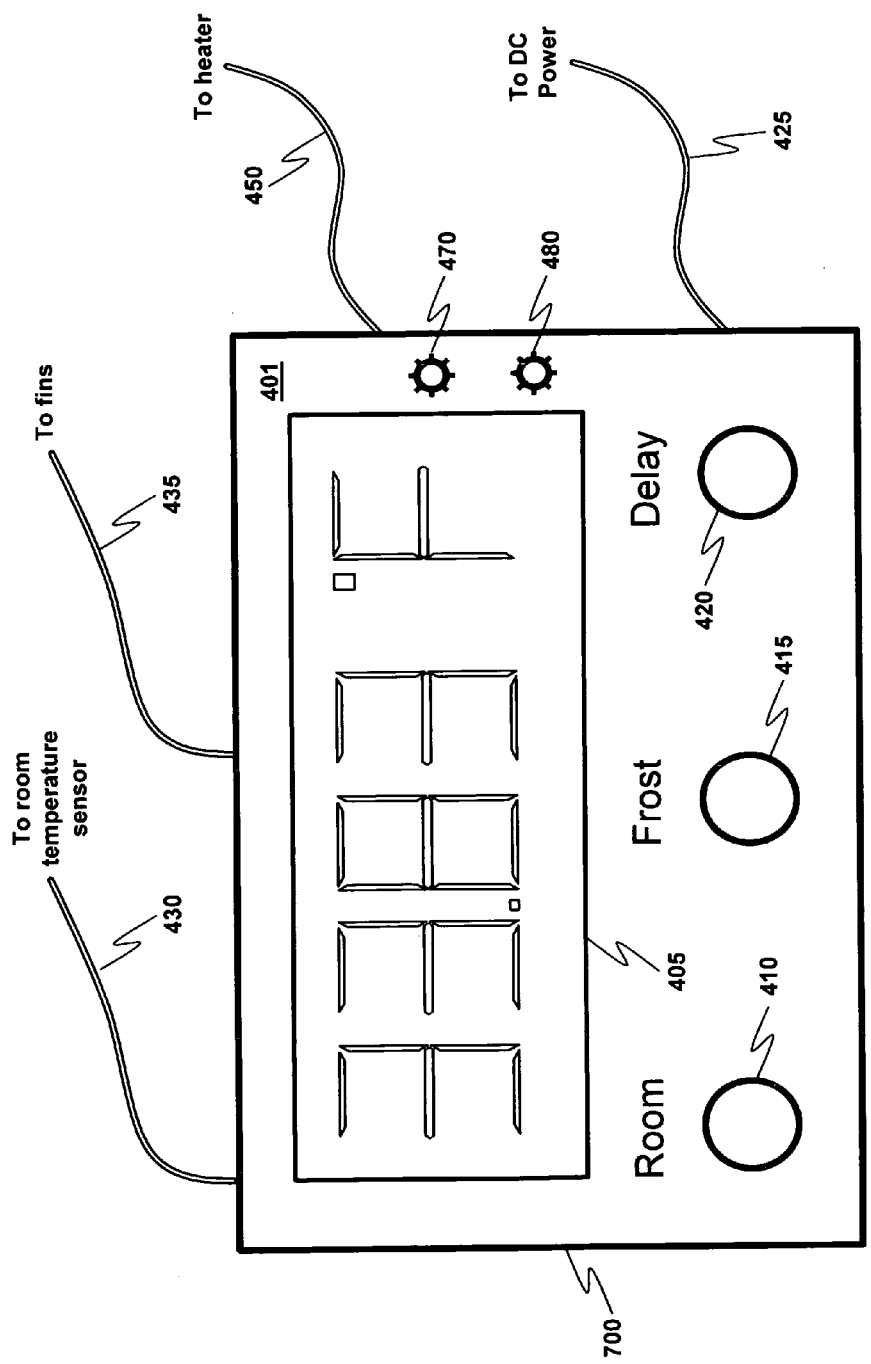
FIG. 4 is a front view of a human interface panel that is employable with the present invention.
Figure 5:
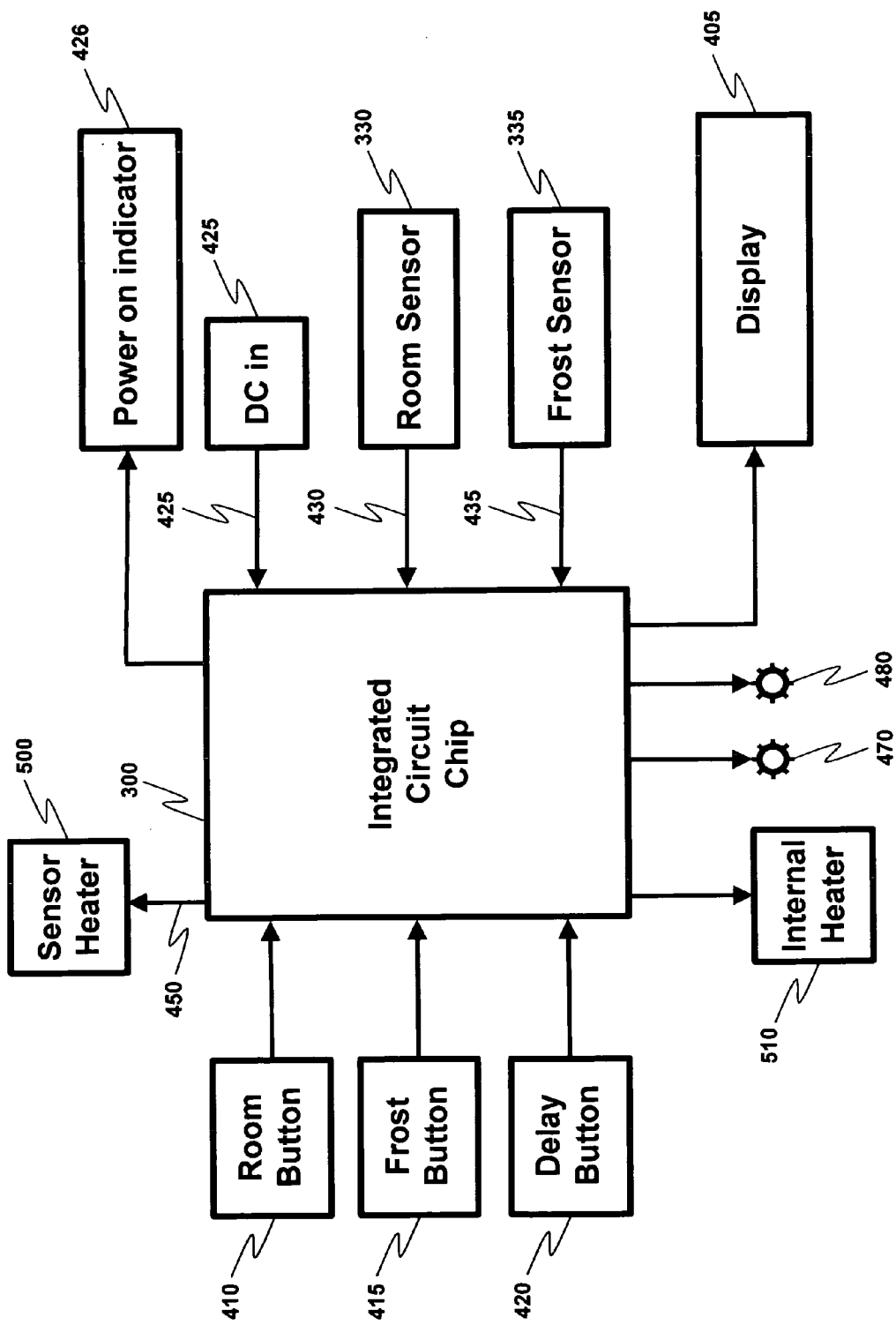
FIG. 5 is a block diagram illustrating the control circuit and the overall structure of the present invention.

FIG. 5 is a block diagram illustrating the various components of the adapter of the present invention. In particular microcontroller 406 is implementable as PIC Microchip microcontroller Model No. 16F916, though many low-end microcontroller chips would also be just as satisfactory. This chip contains code burnt into an EEPROM for implementing the control algorithm and user interface functions described above. There is included also included internal heater 510 on the main circuit board to prevent short-circuits due to condensation. Internal heater 510 is controlled by microcontroller 406. As described above, there is also provided external heater 500 connected via wires 450. This heater is disposed as described elsewhere herein. The heater itself is located on an external cable that plugs into the main circuit board. Heater 500 is also controlled with microcontroller 406. Also provided is power on indicator 426 which is lit when DC power is connected. Two temperature sensors 330 and 335, measuring the room temperature and the temperature of the air conditioner's fins respectively. These sensors are mounted on external cables that plug into the main circuit board. Microcontroller 406 communicates with them using a serial protocol to read the two temperatures at appropriate times. Three input buttons, 410, 415 and 420 are accessible from the front panel and are used to change the parameters of the cooling algorithm, as well as for diagnostic purposes. Their functions are also described in greater detail elsewhere herein. Display 405 is made up of two modules, DIS1 and DIS2. The display is provided in the present implementation solely as a matter of convenience. The relevant aspect of the display is that there are a sufficient number of digits to display the temperature or any optional diagnostic settings. Microcontroller 406 uses these digits to display running status, to provide feedback while the user sets algorithm parameters, and to support diagnostic tests. There are also preferably two status indicator lights (470 and 480 in FIGS. 4 and 5). Indicator 470, which is controlled by controller 300, is lit when the control algorithm determines that the air conditioner should be turned on. Indicator 480, which is also controlled by microcontroller 406, is lit by when the control algorithm determines that current is required in heater 500 in order to heat it to a level that will trigger the air conditioner to turn on.

Attention is now directed to a method by which the present invention is added to an existing air conditioning unit. The first step in this process is the construction of an insulated volume. Materials useful in this process include Styrofoam and SprayFoam which can be applied to seal any cracks or gaps in the structure. At this stage, one should also consider adding extra insulation. If there are windows present in the structure, they should be sealed with Styrofoam or any other useful or available insulative material.

If it does not already exist, a conventional air-conditioning unit is disposed through an opening in the structure wall. The edges of the opening are sealed as well. The next step is the removal of the front portion of the air-conditioning unit. This front portion is typically plastic. It's removal also typically exposes air filters present in the unit. These air filters are also preferably removed. It is recommended that this front portion not be reinstalled. This exposes the fins of the air conditioning unit which produces both an advantage and a disadvantage. The disadvantage is that the fins can be bumped and bent. The advantage is that the fins can easily be cleaned and be bent back into shape as needed.

The next step in the installation procedure is the location and the freeing of the thermocouple sensor that normally comes with the air conditioning unit. Note that this freeing operation is not an electrical disconnection, but rather a moving of the thermocouple away from the fins of the air conditioning unit. Typically the thermocouple is disposed on a long and flexible wire, which is easily bent away from the fins. If there are any plastic ties or other structures holding the thermocouple in place, these are preferably removed as well so as to have the thermocouple swing free of the fins.

The next step in the installation process is the mounting of the device of the present invention on a wall of the structure near the air conditioning unit. Here on this device is referred to herein as the CoolBot™, The CoolBot™ may be provided with any convenient wall fastening means, including screws, adhesives, Velcro or even hung on nails. The CoolBot™ is hung on the wall in a position sufficiently close to the air conditioning unit that wires extending from the CoolBot™ are capable of being connected to appropriate points on the air conditioning unit.

The next step in the installation process is the mating of the thermocouple with the warming element of the CoolBot™. This coupling is designed to ensure close thermal contact between the two elements. In particular, it is possible to join these two elements by placing them next to one another and wrapping them with aluminum foil. Even a single layer of the aluminum foil is adequate; however, multiple layers provide a more secure coupling.

The next step in the installation process is the connection of the CoolBot™'s frost sensor to the fins of the air conditioning unit. Looking at the fins in a typical air-conditioning unit, one sees that there are copper pipes carrying the units refrigerant. The frost sensor is disposed, just below one of the lower copper pipes, which is typically several inches above the bottom of the air conditioning unit. The frost sensor is inserted between two of the fins. One may rely upon a friction fit to hold a frost sensor in place or more preferably, one may bend some of the adjacent the fins together to more ably hold the frost sensor in position. This is easily done with one's fingernails or with a screwdriver For air-conditioning units, which are Energy Star compliant, there is an additional step that is also performed as part of the installation procedure. In particular, the frost sensor that normally accompanies such units is moved. Note, however, that this sensor is not removed only repositioned away from the fins so that it does not interfere with the operation of the CoolBot™. The CoolBot™ is also provided with an ambient room temperature sensor. This sensor should be allowed to hang freely in the cooled volume. The present invention thus renders it very easy to retrofit a conventional room or window air-conditioning unit so as to operate as the core of a refrigeration system. The only other thing that needs to be provided is some form of insulated airtight structure. Wood and Styrofoam structures, which are readily available in rural and third world areas readily suffice for carrying out this function.

Attention is now directed to a view of the front panel of CoolBot™ device 700. In particular, the front panel includes LED (or other technology) display 405 which is used to not only display the current temperature, but is also used to set desirable temperatures to be achieved at the air conditioner fins. It is noted that any convenient display device may be employed and the display is not limited to LED devices; LCD displays are employable; however, it is noted that in many refrigeration environments lighting may be so low that LED displays are a significantly preferred choice. Likewise, LED displays are preferred in situations where condensation may be a factor. Front panel 401 includes the three buttons labeled room, frost, and delay (having reference numerals 410,415, and 420, respectively). Pressing the "ROOM" Button lets one pick the desired room temperature. In current preferred embodiments, the lowest selectable temperature is 32° F. Every time you push the ROOM button, the temperature goes up one degree; when it reaches a maximum temperature, it then starts over again at 32° F. Pressing the "FROST" button allows one to change the frost detection settings. The CoolBot™ device is provided with a default temperature setting for this value, but if ice forms on the fins, pressing the FROST button so that it goes up one or two degrees typically stops this from happening. If the room isn't getting cold and ice is never forming, then the frost temperature is set too high. Pressing the FROST button until it cycles back to the starting point should solve this problem. If no frost is ever forming then either: (1) one has a new Energy Star compliant unit and didn't move its frost sensor; (2) the room is extremely leaky and uninsulated; or (3) the room is too big for the given air conditioning unit. The solution to these last two problems is sealing the room better, adding a second A/C unit or using a single larger unit.

Pressing the DELAY button changes the Delay Mode. This button controls the delay between the time that both sensors' temperatures are above their respective thresholds and when the air conditioner is triggered to operate. The default is ten seconds. Increasing the delay allows the room to get warmer before triggering the air conditioner. This is sometimes useful for air conditioners that have an enforced minimum on-time due to internal control circuitry, so that they run for their minimum on-time without frost forming before they may be turned off.

The CoolBot™ unit shown in FIG. 4 also includes several wires or devices, which need to be connected to the air-conditioning unit. In particular, lead 425 is connected to a DC power source. While a conventional battery could be employed to power the electronic components in control unit 400, the demands of heating element 500 which is placed in thermal contact with thermocouple 209 means that it is significantly more preferred to connect unit 400 to a separate DC power supply. In preferred embodiments of the present invention, the DC power supply is from a converter, which is coupled into the alternating current power supply for the air-conditioning unit. It may also be powered separately. Also shown in FIG. 4 is lead 435 which is connected to frost sensor 400. Likewise, lead 430 is connected to heater 500. These items are considered in the discussion above with respect to FIG. 3.

Figure 6:
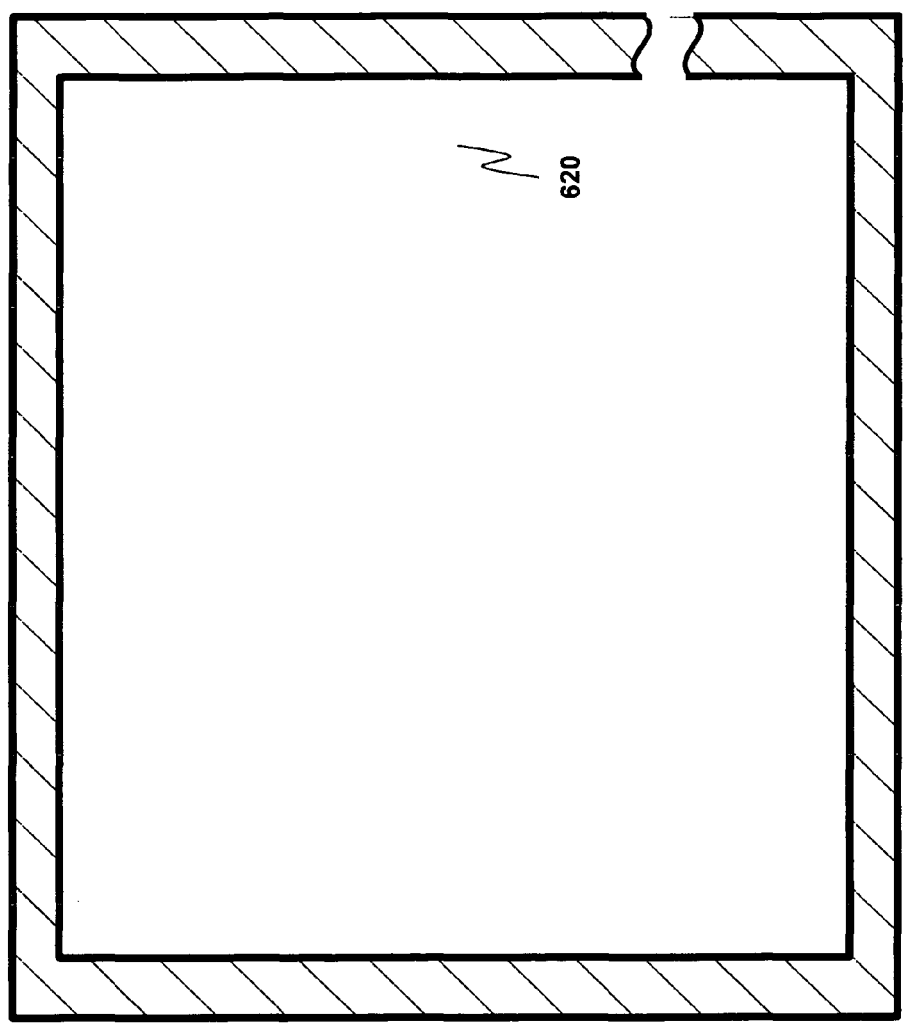
FIG. 6 is a diagram illustrating the adapter of the present invention being employed with a surrounding insulated structure through whose back wall a conventional air conditioning unit is disposed.

FIG. 6 illustrates a typical installation of the adapter described above in its natural environment. This drawing is not to scale, so that all of the features and aspects may better be presented. In particular, conventional but modified air conditioner 100 is disposed through a back wall of insulated structure 600. Air conditioner 100 is depicted as if it had its front cover removed. Adapter device 700 is shown connected to air conditioner 100 in three ways: (1) via DC electrical connection 425; (2) via frost sensor 335 (not visible) connected via wire 435; and (3) via heater 500 connected to temperature sensor 209 via connection 450. FIG. 6 also illustrates the presence of alternating current power outlet 620 into which a power cord from air conditioner 100 is inserted (not shown for reasons of improving clarity of the view). Also shown in FIG. 6 is room temperature sensor 330 connected to adapter device 700 via connecting cable (wire) 430.

Attention is now directed to a description of specific control methods employed in the operation of the CoolBot™ device. For purposes of efficiency, it is desirable to turn the air conditioner unit on and off with as little lag time as possible, that is, with the shortest possible delay between when the algorithm says "A/C off" and when the A/C stops emitting cold air. Turn-on delay is primarily limited by how fast the sensor heater warms up; turn-off delay is limited by how fast it cools down. To be more precise, turn-on delay is the time it takes for the heater to go from its "turned off" temperature past the air conditioner's threshold temperature, and turn-off delay is the time it takes for the heater to go from its "steady state on" temperature past the air conditioner's threshold in the other direction. The turn-on delay is smallest when the "turned off" temperature is high (but below under the air conditioner's threshold temperature) and when the current put through the external heater 500 is largest. The turn-off delay is smallest when the "steady state on" temperature is low (but greater than the air conditioner threshold temperature) and when the room temperature is much cooler than that temperature. Accordingly, desirable performance levels are achieved if the current supplied to heater 500 is just sufficient to keep the temperature just above the air conditioner's threshold temperature while it's "on" and to supply slightly less current while it's "off."

One way to accomplish this control is through the use of a PID (position, integral, differential) control. This allows for precise control of the heater's temperature, but it also requires an additional sensor for feedback, which adds an expense, both for parts and for assembly. However, in certain cases where precise control over a long period of time is desirable for reasons of efficiency, this expense is tolerable.

The following items further describe a control algorithm and method for using the CoolBot™ device:

When turning on the heater, keep it completely on (full current flow) for an initial length of time, approximately one minute; however, this value may be increased or decreased depending on the current room temperature.

Use a relatively low resistance for heater 500, so that it "sees" a relatively high current and gets hot fast.

After the initial turn-on period, use Pulse Width Modulation (PWM) to reduce the average current through the heater, and thus the heat dissipated. This stabilizes the heater temperature, rather than driving it as hot as it can possibly go. Thus, when the heater is turned on, its lower temperature results in faster turn-off In short, PID control is an option but there is a trade-off between cost and performance. Using PWM to reduce steady-state temperature makes for faster turn-off and customizing the PWM period (100% initially, decreasing later) makes for faster turn-on.

The use of PWM as a form of control is also relevant to a cooperative control method for supplying power to internal heater 510 and external heater 500. Internal heater 510 is used to reduce condensation on the circuit board. Its use is also beneficial in that it contributes to the elimination of a manufacturing step in which a conformal coating is applied to the circuit board and its components to ameliorate problems associated with condensation and/or other environmental contaminants. However, it is noted that, if internal heater 510 runs constantly, peak current load goes over one ampere in the current design. A DC power supply capable of producing more than one ampere often costs significantly more than one designed for less than one ampere. Accordingly, control in the CoolBot™ device turns internal heater 510 off whenever external heater 500 is on. Since only one heater is on at any given time, the peak load is not the combined load but the maximum. It's much easier to keep this under one ampere and to thus employ a less expensive power supply.

Figure 8:
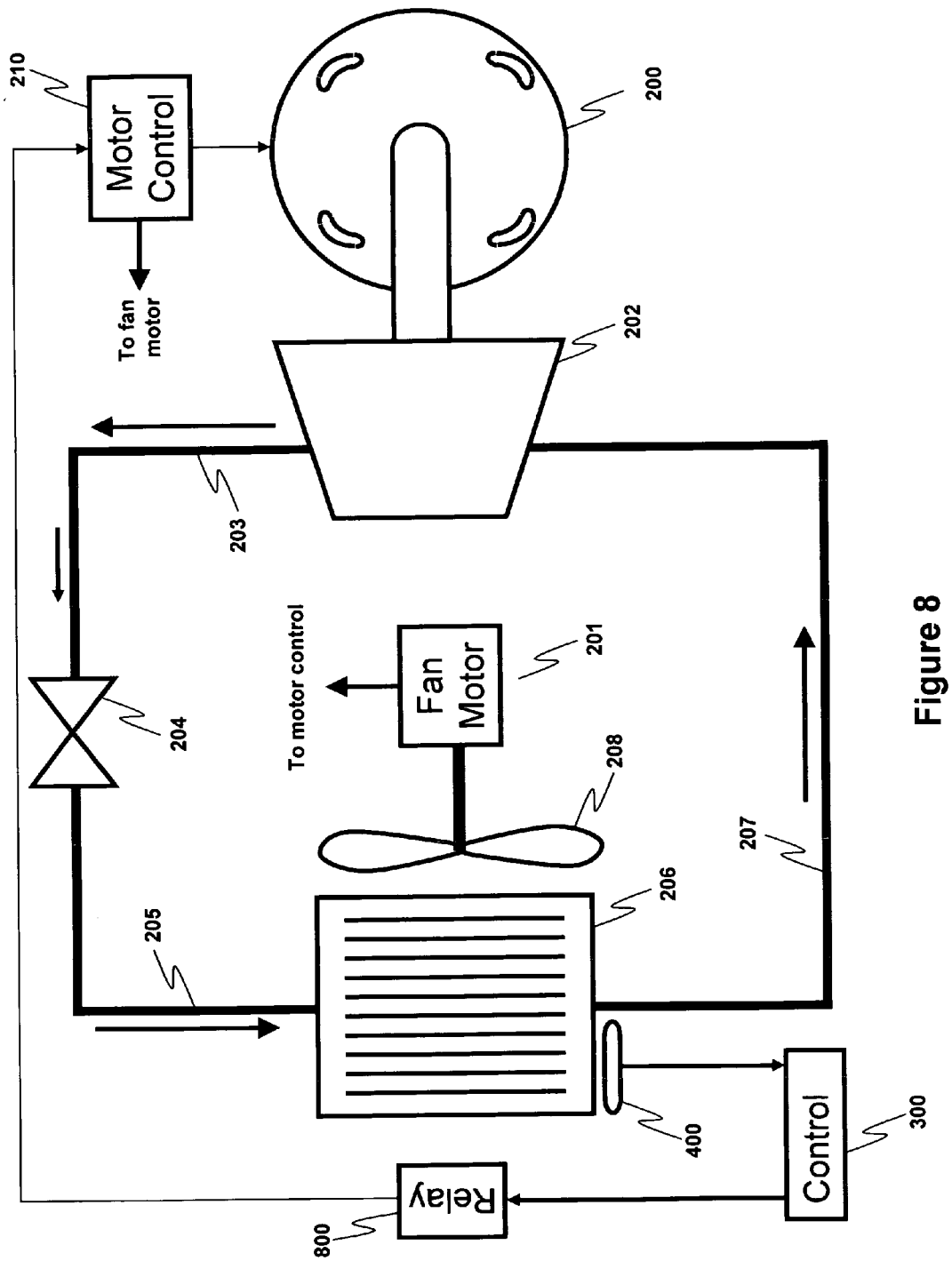
FIG. 8 is similar to FIG. 3 except that a relay is employed instead of a heater.

As indicated above, certain air conditioners do not employ a thermistor for temperature sensing purposes. Instead such vehicles typically employ the above mentioned capillary tube temperature probes. Such probes are not easily "fooled" by the use of a heater. Therefore, in accordance with one embodiment of the present invention, the temperature control unit that is supplied with the air conditioner is replaced with a relay. For example, see relay 800 in FIG. 8 which is the same as FIG. 3 except for the replacement of heater 500 by relay 800. This is easily accomplished since such analog temperature control units are typically provided as plug-in assemblies. Thus, in this embodiment, the entire temperature control unit is replaced by a relay. This requires no modification of the above described CoolBot™ device other than removal of the heater and its replacement by a relay and a change in the firmware to provide a continuous signal to the relay as opposed to a pulsed signal which is preferably supplied in the embodiment using a heater. This really is a simple switch which is controlled by the same voltage level used to operate the heater. In this manner, the present invention is seen to be also applicable to use in recreational vehicles.

Figure 9:
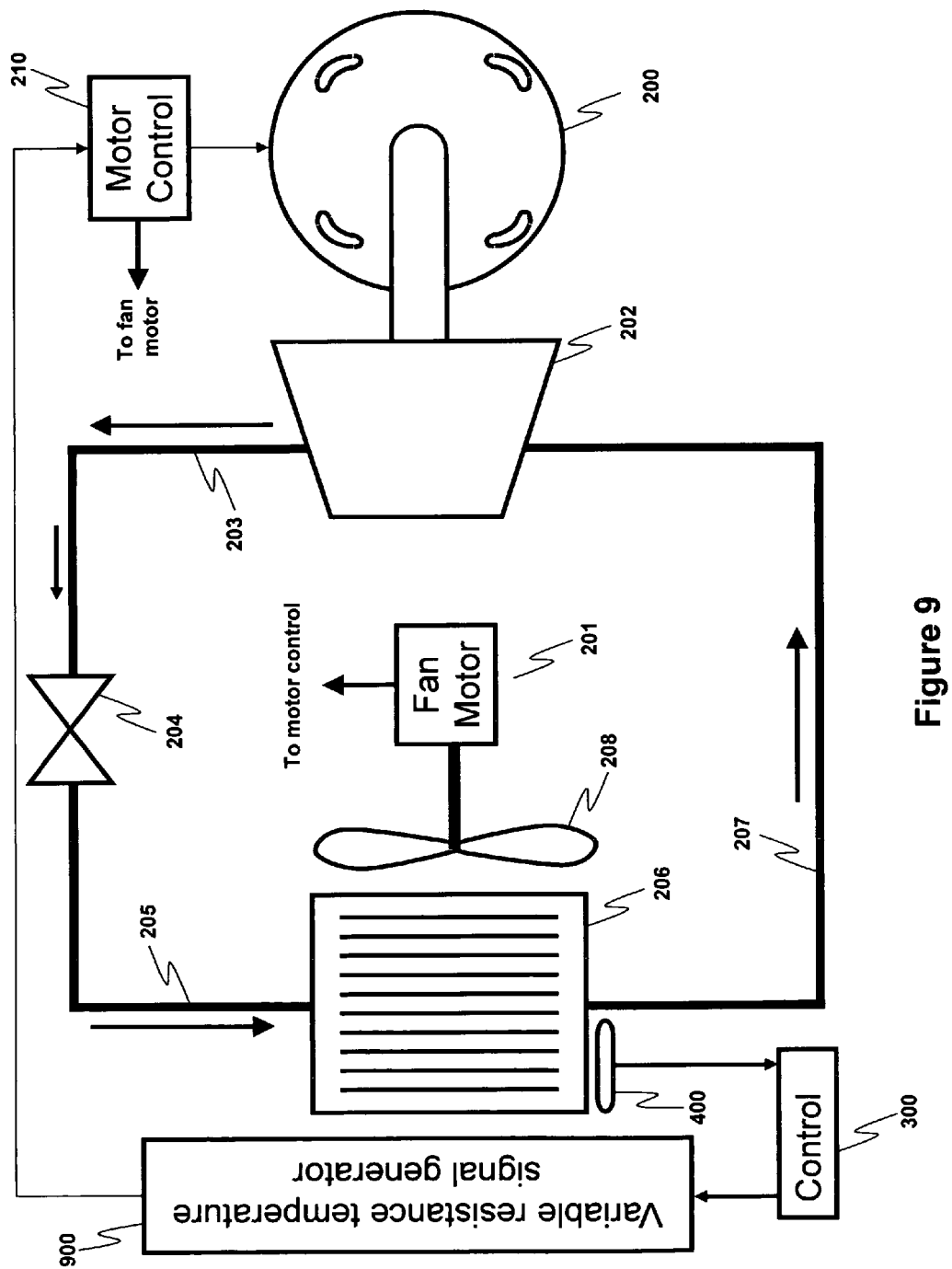
FIG. 9 is also similar to FIG. 3 except that a variable resistance temperature signal generator is employed instead of a heater.

In a still further embodiment of the present invention rather than either using a heater, or replacing the heater with a relay, the CoolBot™ device operates to provide the same kind of information that is expected by the air conditioner. In particular, in certain circumstances the air conditioner is controlled by a thermistor which interprets variable electrical resistance as indicative of temperature. Thus, in a third embodiment of the present invention, the defeating means for overriding operation of a temperature sensor used to determine the lower limit for air conditioner operation comprises a single line which also supplies a variable resistance to mimic lower and higher temperatures. See variable resistance temperature signal generator 900 in FIG. 9 which is the same as FIG. 3 except for the replacement of heater 500 by variable resistance temperature signal generator 900. Thus it is seen that the defeating means may comprise either a heater, a relay, or variable-resistance temperature signal-generator.

Figure 7:
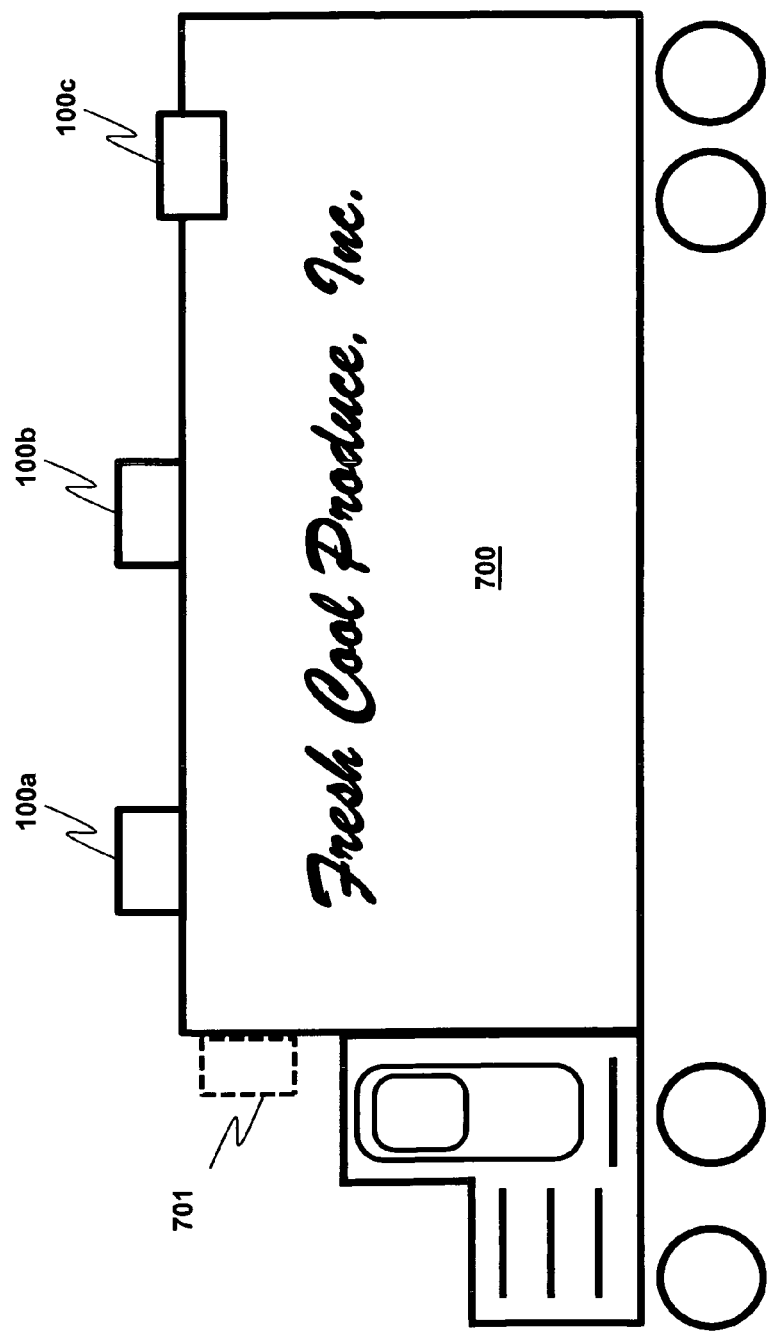
FIG. 7 illustrates the use of the present invention as a replacement system for a large refrigerated truck.

The present invention is also useful in replacing refrigeration systems found in the trucking industry. In particular, for a large truck, such a refrigeration system is typically seen to cost approximately $14,000. However, as shown in FIG. 7, truck 700 is cooled using three conventional air conditioners (100a, 100b and 100c). These units replace conventional refrigeration unit 701 (shown in phantom form). Assuming that a conventional air conditioner costs approximately $500 and a CoolBot™ device costs approximately $300, one sees that one can provide the same level of cooling for a total of $2,400. The number of CoolBot™ devices employ it is selected based upon the vehicle volume that is to be cooled. This represents a savings per vehicle of over $10,000. However, given the size of the largest of the refrigerated trucks, particularly in terms of their height, it is seen that the advantages of the present invention are often best achieved when the devices are deployed within recessed areas of the truck ceilings. Such a recessed unit (100c) is shown in FIG. 7. For smaller vehicles, disposition in recessed areas is typically unnecessary and is typically employed only as called for by truck height limitations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of keeping food, produce or crops at a reduced temperature by cooling a volume to a refrigeration temperature, the volume being defined at least in part by a wall, the method comprising:

(a) mounting an unmodified conventional room air conditioning unit of the type that has an air conditioner temperature sensor with a lower cutoff temperature of 60° F. or higher, a compressor, and cooling fins, through the wall of the volume with the cooling fins and the temperature sensor disposed inside the volume;

(b) mounting a frost sensor on the fins of the air conditioning unit;

(c) mounting a heater in close proximity to the temperature sensor of the air conditioning unit;

(d) locating a room temperature sensor in the volume in a location remote from the heater and the frost sensor; and (e) operating a control unit having inputs coupled to the frost sensor and the room temperature sensor and an output coupled to the heater, to cause the air conditioner to reduce the temperature in the volume to a desired reduced temperature below the lower cutoff temperature of the air conditioner temperature sensor while avoiding significant frost build up on the fins by the steps of:

(i) monitoring an ambient temperature in the volume with the room temperature sensor;

(ii) if the room temperature sensor indicates that the ambient temperature in the volume is above the desired reduced temperature, activating the heater to apply heat to the temperature sensor of the air conditioning unit such that the temperature sensor of the air conditioning unit senses a temperature above the designed lower cutoff temperature of the air conditioning unit and the air conditioning unit turns on the compressor;

(iii) when the room temperature sensor indicates that the ambient temperature in the volume is at or below the desired reduced temperature, deactivating the heater, such that the air conditioning unit turns off the compressor; and (iv) enabling the heater in response to a negative reading of the frost sensor and disabling the heater in response to a positive reading of the frost sensor so as to ameliorate the buildup of frost on the fins.

2. The method of claim 1, further comprising the step of the control unit delaying the activating of the heater in step (e)(ii) for a selected delay period after the room sensor senses a temperature above the desired reduced temperature and the frost sensor does not detect a frost condition.

3. The method of claim 1, in which the desired reduced temperature is near freezing.

* * * * *